UNITED STATES PATENT OFFICE.

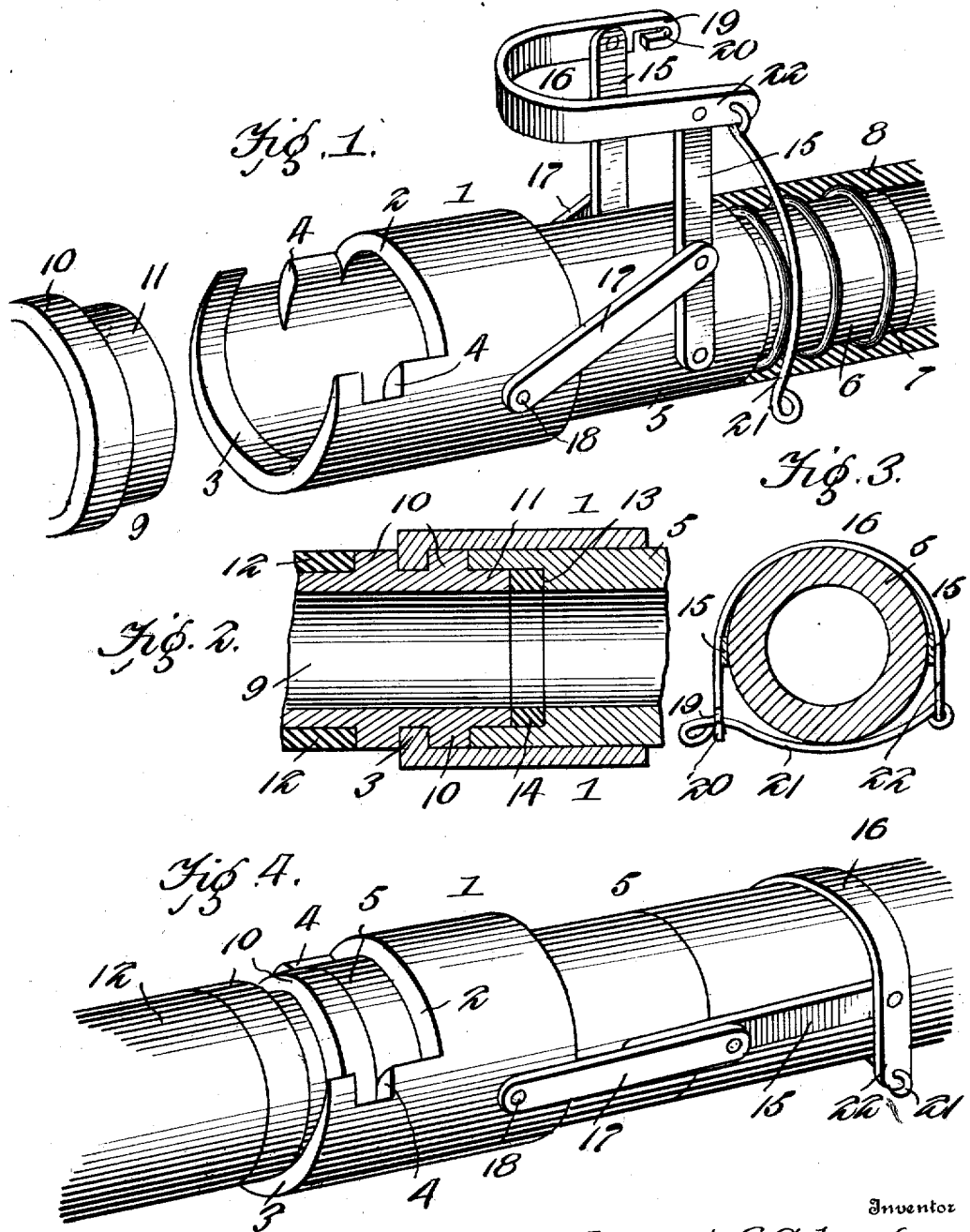

FREDRICK G. SCHAEFER, OF WAUSAU, WISCONSIN.

HOSE-COUPLING.

954,348.

Specification of Letters Patent.

Patented Apr. 5, 1910.

Application filed May 15, 1909. Serial No. 496,099.

*To all whom it may concern:*

Be it known that I, FREDRICK G. SCHAEFER, a citizen of the United States, residing at Wausau, in the county of Marathon and State of Wisconsin, have invented new and useful Improvements in Hose-Couplers, of which the following is a specification.

This invention relates to hose couplers, and has for an object to provide a device of this character which will include novel forms of connections for receiving the ends of the hose and to further provide simple and novel form of clamping means arranged to draw the ends of the hose toward each other and their connections into such frictional contact with each other as will form a perfect water tight joint.

Other objects and advantages will be apparent as the nature of the invention is better set forth, and it will be understood that changes within the scope of the claim may be resorted to without departing from the spirit of the invention.

In the drawing, forming a portion of this specification and in which like numerals of reference indicate similar parts in the several views:—Figure 1 is a fragmentary perspective view of my improved coupler showing one of the pipe sections in position to be engaged with the coupler. Fig. 2 is a detail longitudinal section taken through a portion of the coupler. Fig. 3 is a transverse section taken through a portion of the coupler showing the latch member. Fig. 4 is a perspective view of the coupler showing its engagement with alining pipe sections.

Referring now more particularly to the drawing, there is shown a hose coupling comprising a member or sleeve 1 provided at one end with a cutaway portion or recess 2, and as shown said member or sleeve is provided with an arcuate or annular flange 3 and with shoulders 4 which are disposed in spaced relation to the flange. The member or similar hollow element 5 which is provided with a reduced end portion 6 is corrugated exteriorly as illustrated at 7 so that a hose or similar flexible connection 8 can be engaged at one end with the said corrugated reduced portion of the sleeve or element 5. A sleeve or member 9 is used in conjunction with the sleeve 1 and is provided with a pair of spaced rings or flanges 10 which are adapted to straddle the flange 3 at one end of the sleeve 1. As illustrated the inner end of the sleeve or member 9 is provided with an extension 11 which is disposed in a portion of the sleeve 1 for a purpose to be hereinafter more fully explained. The sleeve or member 9 is corrugated upon its exterior surface and has secured thereto one end of a hose or flexible connection 12. The sleeve or hollow element 5, upon its inner end is rabbeted interiorly as illustrated at 13 and is adapted for overlapping engagement with the extension 11 of the sleeve or member 9. The rabbeted portion 13 of the sleeve or element 5 has seated therein an elastic washer or packing 14 which is adapted to be frictionally engaged with the inner annular face of the extension 11 so as to form, when the coupling is in its operative position a perfect water tight joint as will be readily understood.

The sleeve or hollow element 5 is provided with a pair of pivoted arms 15 which have their free ends secured to a yoke or operating lever 16 as shown. The arms 15 have pivoted thereto the outer extremities of links 17, the inner extremities of said links being pivotally engaged with studs or the like 18 which extend horizontally from the member or sleeve 1. The arm 19 of the yoke 16 is provided with a hooked extremity 20 which is adapted to receive one end of a spring latch member 21 which is pivotally connected to the arm 22 of the yoke.

In operation, assuming the ends of the hose or flexible connections to be engaged as hereinbefore described with the sleeves 5 and 9, the sleeve or member 9 is lifted bodily and inserted in the cutaway portion of the sleeve 1 so that the flanges or rings 10 straddle the flange 3 in a manner that will effectively prevent sliding longitudinal movement of the sleeve or member 9. Assuming the arms 15 to be in their vertical positions, it will be seen that upon movement of the yoke 16 in the direction of the arrow indicated in Fig. 4 the links 17 will be moved downwardly at their outer ends so that their points of pivotal engagement with the arms 15 will occupy points below the points of pivotal engagement of the arms 15 with the sleeve or hollow element 5. When the yoke 16 has been moved downwardly to the extent of its movement the arms 19 and 22 straddle a portion of the hose 8, and by providing the latch member 21 it is obvious that it can be operated so that its free extremity can be engaged with the hooked portion 20 of the arm 19 in order that the yoke 16 can be held in its operative position. In this operation of the yoke, it will be appreciated that the sleeve or hollow element 5 will be moved longitudinally in the sleeve 1 and the inner extremity of said sleeve will be brought into overlapping engagement with the extension 11 of the sleeve 9 and the said extension will be engaged with the elastic washer or packing 14 to the extent that a perfect water tight joint is formed at this point.

I claim:—

A coupling of the class described comprising slidably mounted sleeves, a pair of arms pivotally connected to one of the sleeves, links connecting the other sleeve with said arms, a lever operatively connected with the arms for rocking them to move one sleeve on the other, a hose carried by one of the sleeves, a hose carrying member adapted for locking engagement with the other sleeve and provided with an extension upon its inner end adapted for engagement with the inner end of the sliding sleeve, said lever having a pair of spaced arms which are adapted to straddle a portion of the hose and to extend downwardly beneath the same, one of said arms having a slot formed therein, and a latch member carried by the other arm adapted to underlie the hose and to be secured in the slot to hold the sleeves against movement on each other.

In testimony whereof I affix my signature in presence of two witnesses.

FREDRICK G. SCHAEFER.

Witnesses:
   AMY E. MILLER,
   LEON C. MILLER.